3,100,683
ADSORPTION OF CERIUM VALUES FROM AQUEOUS SOLUTIONS
Francis P. Roberts, Richland, Wash., assignor to the United States of America as represented by the United States Atomic Energy Commission
No Drawing. Filed July 18, 1962, Ser. No. 210,864
5 Claims. (Cl. 23—23)

This invention deals with the recovery of cerium values from aqueous solutions and in particular with their selective adsorption away from lanthanide rare earth, yttrium and strontium values.

Cerium is often obtained in aqueous solutions together with lanthanide rare earths and $Ce^{144}$ in particular as a fission product in solutions obtained by the processing of radioactive nuclear fuel material. The $Ce^{144}$ usually contains, in addition to the lanthanide rare earths, also $Sr^{90}$ and $Y^{90}$. The isolation of cerium from these other elements is rather difficult on account of their similar chemical behavior.

There are a great many utilities for cerium for which it has to be free of the "contaminating" elements mentioned above, and it is also important to isolate the cerium for analytical purposes when the cerium content of such solutions is to be determined.

Cerium has been isolated heretofore by precipitation processes, by solvent extraction or by adsorption of the stable trivalent cerium on cation exchange materials, in particular on cation exchange resins. The adsorption on anion exchange resins of the tetravalent nitric-acid-complexed cerium has also been investigated. However, it was found that the resins used have a strong reducing power for the tetravalent cerium and convert it to the trivalent cerium which is not complexed by nitric acid and not adsorbable by anion exchange resins.

It is an object of this invention to provide a process for the separation of tetravalent cerium from other lanthanide, strontium and yttrium values by adsorption on anion exchange resins whereby a reduction of the cerium to the trivalent state does not occur.

It is another object of this invention to provide a process for the separation of cerium from other lanthanide, strontium and yttrium values by adsorption on anion exchange resins for which the cerium-containing feed solution does not have to be preoxidized to bring the cerium into the tetravalent state, because solutions containing the cerium in the trivalent state can be used.

It is still another object of this invention to provide a process for the separation of tetravalent cerium from other lanthanide, strontium and yttrium values in which the cerium is recovered quantitatively.

It is finally also an object of this invention to provide a process for the separation of tetravalent cerium from other lanthanide, strontium and yttrium values which yields high decontamination factors for the cerium from rare earths, strontium and yttrium associated therewith.

It has been found that solid lead peroxide or dioxide, $PbO_2$, in strong nitric acid rapidly oxidizes trivalent cerium to the tetravalent state and maintains it in this higher oxidation state. It has also been found that the cerium to be adsorbed on the anion exchange resin need not be in the tetravalent state, because trivalent cerium is readily converted on the resin to the tetravalent state if lead peroxide is present; the cerium is then quantitatively adsorbed. Trivalent rare earths are not adsorbed to a substantial degree by anion exchange resins, nor are strontium or yttrium, which accounts for a good separation. Lead peroxide is insoluble in nitric acid and therefore remains on the resin, to which it has been admixed, during contact with nitric acid feed solutions.

The process of this invention comprises mixing a strong-base anion exchange resin with lead peroxide, converting the resin to its nitrate form by passing a concentrated nitric acid thereover, contacting the resin with a strongly nitric-acid cerium-containing feed solution whereby the cerium values are preferentially taken up by the resin and eluting the cerium values from the resin with mineral acid.

The adsorption of the cerium values by the anion exchange resin is greatly dependent on the nitric acid concentration and, as will be shown later in Example II, the nitric acid concentration for satisfactory operation should be at least 2 M and not higher than 13 M; the preferred concentration is between 6 and 9 M, and the very best results were obtained with 7 M nitric acid.

All strong-base anion exchange resins are satisfactorily operative for the process of this invention. For the experiments that led to this invention a resin was used that is made according to column 2, line 36, to column 3, line 22, of U.S. Patent No. 2,559,529, granted to William C. Bauman on July 3, 1951.

As has been mentioned, the resin has to be in the nitrate form, which is accomplished by washing it with an about 8 M nitric acid.

The quantity of lead peroxide added should be in the range of from 10 to 200 grams per liter of resin. For many purposes it is sufficient simply to add just enough lead peroxide to color the resin black. A more detailed discussion of the influence of varying ratios of lead peroxide to resin is given in connection with Example IV.

Contact is carried out at room temperature, which is about 25° C. The feed solution can be passed continually over a column or bed of the resin.

Small quantities of the "contaminants" listed above are always adsorbed by the resin, or they adhere thereto by surface action. These minor quantities can be removed by washing the resin with concentrated nitric acid of a concentration, for instance, of between 6 and 10 M, preferably 8 M.

Thereafter the cerium is eluted with mineral acid. For this purpose, hydrochloric acid or nitric acid have been found suitable, the hydrochloric acid requiring a higher concentration than the nitric acid. The best concentration for the hydrochloric acid is between 3 and 5 M, 4 M being preferred, while for the nitric acid a concentration of between 0.5 and 1.5 M is most satisfactory. Hydrochloric acid is more advantageous than nitric acid, because smaller volumes of it are necessary to elute the cerium than are for the nitric acid. This is shown in Example I.

EXAMPLE I

Two parallel experiments were carried out, each using the same quantity of resin after it had been contacted for the same period of time with the same type of cerium-containing nitric acid feed solution. In one experiment the cerium was eluted with 0.5 M nitric acid, while for the other experiment the eluant was 4.0 M hydrochloric acid. Each of two column volumes of eluate was analyzed for its cerium content; a total of 8 column volumes was used in each experiment. The results are summarized in Table I.

*Table I*

| Number of column volumes | Percent of Ce eluted | |
|---|---|---|
| | 0.5 M $HNO_3$ | 4.0 M HCl |
| 2 | 32.9 | 99.4 |
| 4 | 63.0 | 99.7 |
| 6 | 82.9 | 100 |
| 8 | 92.2 | 100 |

It will be readily apparent that, while eight column volumes of nitric acid eluted about 92% of the adsorbed cerium, only two volumes of 4 M hydrochloric acid removed more than 99%.

The next example shows the interrelationship of distribution coefficients for cerium and nitric acid concentration of feed solution. As in Example I, the resin used was that prepared according to U.S. Patent No. 2,559,529, known in the industry as Dowex 1.

EXAMPLE II

Five ml. of a nitric acid soution containing $Ce^{144}$ and $Pr^{144}$ in tracer concentration was agitated for 24 hours with 0.50 gram of a vacuum-dried resin in the nitrate form to which 50 mg. of solid lead dioxide had been added. After 24 hours the resin was separated from the solution and the latter was allowed to assume equilibrium as to beta decay of $Pr^{144}$, that had been formed from the $Ce^{144}$ by beta emission.

The aqueous solution was then analyzed; from the cerium concentration of the original feed solution (A) and the cerium concentration retained in the solution after contact with the resin (B) the distribution coefficient of the cerium was calculated. The distribution coefficient is $$\frac{(A-B)/ml. \ solution}{B \times grams \ of \ resin}$$

Eight experiments were carried out, each using a different concentration of nitric acid in the feed solution. The results of these experiments are summarized in Table II.

Table II

| $HNO_3$ concn., M: | Distribution coeff. |
|---|---|
| 1 | 2 |
| 2 | 7.8 |
| 3.8 | 57 |
| 4.2 | 79 |
| 5.7 | 160 |
| 7.0 | 255 |
| 8.9 | 160 |
| 10.4 | 70 |

The above results clearly indicate that nitric acid of a concentration of below 2 M does not give satisfactory results. Likewise, if the above data are plotted in a curve and the distribution coefficients of nitric acid concentrations above 10.4 M are extrapolated, it will be found that nitric acid concentrations above 13 M also do not yield good distribution coefficients. Therefore, the nitric acid concentration should range between 2 and 13 M; radically superior results are obtained with concentrations between 6 and 9 M.

EXAMPLE III

A feed solution containing known tracer concentrations of $Ce^{144}$—$Pr^{144}$, 1 mg. of inert, nonradioactive, cerium and nitric acid in a concentration of 8 M was passed over a 1-ml. column of Dowex 1 resin containing 0.5% by weight of lead peroxide. After contact the resin was washed with 10 ml. of 8 M nitric acid for removal of any adsorbed praseodymium and thereafter with 3 ml. of 4 M hydrochloric acid for the elution of cerium. The cerium was counted by gamma-energy analysis after it had come to an equilibrium with the $Pr^{144}$ formed therefrom. Six runs were carried out. The results are summarized in Table III.

Table III

| Run: | Percent Ce recovered |
|---|---|
| 1 | 98.7 |
| 2 | 104.2 |
| 3 | 99.6 |
| 4 | 97.0 |
| 5 | 98.9 |
| 6 | 96.7 |

Recovery was at least 96%.

The following example demonstrates the effect of lead-dioxide concentration in the resin on the cerium recovery and decontamination of some of the other fission products.

EXAMPLE IV

Glass columns having an inside diameter of 4 mm. and a height of 80 mm. were used; they contained a mixture of 1.0 ml. of the anion exchange resin defined in column 2, lines 16 to 20, of this specification and varying amounts of lead dioxide. For the preparation of the resin-lead dioxide mixture, the resin was placed in the column and washed with 3.0 column volumes of 8.0 M nitric acid to convert the resin to the nitrate form. The appropriate amount of lead dioxide, weighed on an analytical balance, was added to the column and mixed with the resin by slurrying with a steel stirring rod until the mixture appeared homogeneous.

A feed was prepared to simulate an actual fission product mixture. The cerium was present in this feed in the trivalent form, and neodymium was used as a stand-in for the other trivalent rare earths. A small amount of a radio-active fission product mixture was added to enable the radiometric determination of cerium recovery and decontamination of the fission products. The feed solution thus prepared was 7.2 M in nitric acid, and also contained 3.1 g./l. of Ce (III), 7.9 g./l. of neodymium and traces of fission products.

Five columns were used, and one ml. of the feed was passed through each column. Nine column volumes of 8.0 M nitric acid were then passed through the resin as a washing solution. Finally the cerium was eluted with each instance with four ml. of 4.0 M nitric acid. The effluents from the loading, wash and elution steps were collected separately and analyzed by gamma energy analysis to determine the $Cs^{137}$—$Ba^{137}$, $Ce^{144}$—$Pr^{144}$, $Ru^{106}$—$Rh^{106}$, and $Zr^{95}$—$Nb^{95}$ contents. $Sr^{90}$ was measured by a standard precipitation method. The neodymium was determined in the wastes spectrophotometrically with a precision of ±5%. The results are given in Table IV as percentages of the amounts that were present in the feed solution.

Table IV

| Grams $PbO_2$/liter of resin | 5 | 10 | 50 | 100 | 200 |
|---|---|---|---|---|---|
| Cerium in product, percent | 16.2 | 96.6 | 100 | 99.6 | 96.3 |
| $Sr^{90}$ in product, percent | <1 | <1 | <1 | <1 | <1 |
| $Ru^{106}$—$Rh^{106}$ in product, percent | <1 | <1 | 2.2 | 1.2 | 1.4 |
| $Cs^{137}$—$Ba^{137}$ in product, percent | (1) | (1) | (1) | (1) | (1) |
| $Zr^{95}$—$Nb^{95}$ in product, percent | <2 | <2 | 15 | 38 | 74 |
| Nd in waste, percent | 100 | 100 | 100 | 100 | 100 |

[1] Not detectable. Much less than 1.

These results show that under the conditions used the cerium recovery was at a maximum for concentrations near 50 grams $PbO_2$/liter of resin. The $Zr^{95}$—$Nb^{95}$ contamination increased with increasing lead dioxide concentration.

Cerium finds use in the industry as a component of alloys, for instance, spark-producing alloys; for a scavenger in steel making; as a getter for noble gases in radio tubes; and as a component of flashlight powders. $Ce^{144}$, in particular, is used in atomic batteries known as Snap-type batteries.

It will be understood that the invention is not to be limited to the details given herein but that it may be modified within the scope of the appended claims.

What is claimed is:

1. A process of recovering cerium values from an aqueous solution, comprising mixing from 10 to 200 grams of lead peroxide with each liter of a strong-base anion exchange resin; passing an about 8 M nitric acid over said resin to convert the latter to the nitrate form; providing a nitric acid concentration of between 2 and 13 M in a cerium (III)-containing feed solution, whereby a cerium-nitrate complex is formed; contacting the resin with said feed solution whereby the cerium values are preferentially taken up by said resin; separating the resin from the cerium-depleted aqueous solution; and eluting the cerium values from the resin with mineral acid selected from the group consisting of 3 to 5 M hydrochloric acid and 0.5 to 1.5 M nitric acid.

2. A process of separating cerium values from contaminating values selected from the group consisting of lanthanide rare earth values, yttrium values and strontium values present together with cerium (III) values in an aqueous feed solution, comprising mixing from 10 to 200 grams of lead peroxide with each liter of a strong-base anion exchange resin; passing an about 8 M nitric acid over said resin to convert the latter to the nitrate form; providing a nitric acid concentration of between 2 and 13 M in said feed solution, whereby a cerium-nitrate complex is formed; contacting the resin with said feed solution whereby the cerium values are preferenitally taken up by said resin while said contaminating values preferentially remain in the aqueous solution; separating the resin from the cerium-depleted aqueous solution; washing the resin with nitric acid having a concentration of between 6 and 10 M, whereby said contaminating values are removed; and eluting the cerium values from the resin with mineral acid selected from the group consisting of 3 to 5 M hydrochloric acid and 0.5 to 1.5 M nitric acid.

3. The process of claim 2 wherein the quantity of lead peroxide is about 50 grams per liter of resin and the nitric acid concentration of the feed solution is adjusted to between 6 and 9 M.

4. The process of claim 3 wherein the nitric acid concentration of the feed solution is adjusted to about 7 M.

5. The process of claim 2 wherein the cerium values are eluted from the resin with hydrochloric acid having a concentration of about 4 M.

References Cited in the file of this patent
UNITED STATES PATENTS

| | | |
|---|---|---|
| 2,636,044 | Huffman et al. | Apr. 21, 1953 |
| 2,897,050 | Jaffe | July 28, 1959 |